United States Patent [19]

Duttweiler et al.

[11] 4,095,053

[45] June 13, 1978

[54] QUASI-PULSE STUFFING SYNCHRONIZATION

[75] Inventors: Donald Lars Duttweiler, Colts Neck; Allan Michael Hofmann, Jackson, both of N.J.

[73] Assignee: Bell Telephone Laboratories, Incorporated, Murray Hill, N.J.

[21] Appl. No.: 829,664

[22] Filed: Sep. 1, 1977

[51] Int. Cl.² .............................................. H04J 3/06
[52] U.S. Cl. ................................................ 179/15 AF
[58] Field of Search ..................... 179/15 AF, 15 BS; 358/148

[56] References Cited

U.S. PATENT DOCUMENTS

| | | | |
|---|---|---|---|
| 3,461,245 | 8/1969 | Johannes | 179/15 AF |
| 3,830,981 | 8/1974 | Gruber | 179/15 AF |

OTHER PUBLICATIONS

IEEE Transactions on Communication Technology, vol. com-16, No. 2, Apr., 1968, pp. 252-254, Butman, S., "Synchronization of PCM Channels by the Method of Word Stuffing".

*Primary Examiner*—William C. Cooper
*Assistant Examiner*—Joseph A. Popek
*Attorney, Agent, or Firm*—Richard J. Roddy

[57] ABSTRACT

In a digital communication system, synchronization of a plurality of asynchronous digital signals is usually achieved by stuffing one or more pulses in a pulse stream. Thereby, stuffing equalizes the input signal bit rate with the usually fixed bit rate of a signal on a transmission link. For example, in pulse stuffing, single pulses are added at certain allowed times to equalize the input bit rate with the transmission link bit rate. On the other hand, in block stuffing, a block of pulses is added. However, conventional block stuffing usually requires a narrowband phase-locked loop for removing jitter in the received signal. As a result, slower acquisition of synchronization occurs. To mitigate this and other problems in a block oriented system, an improved arrangement, called quasi-pulse stuffing synchronization, employs block stuffing at a transmitter and pulse destuffing at a receiver in combination with a control signal for identifying when a digital signal would have been pulse stuffed if the system were employing pulse stuffing. Thereby, jitter can be removed using a conventional widerband, pulse stuffing phase-locked loop.

4 Claims, 2 Drawing Figures

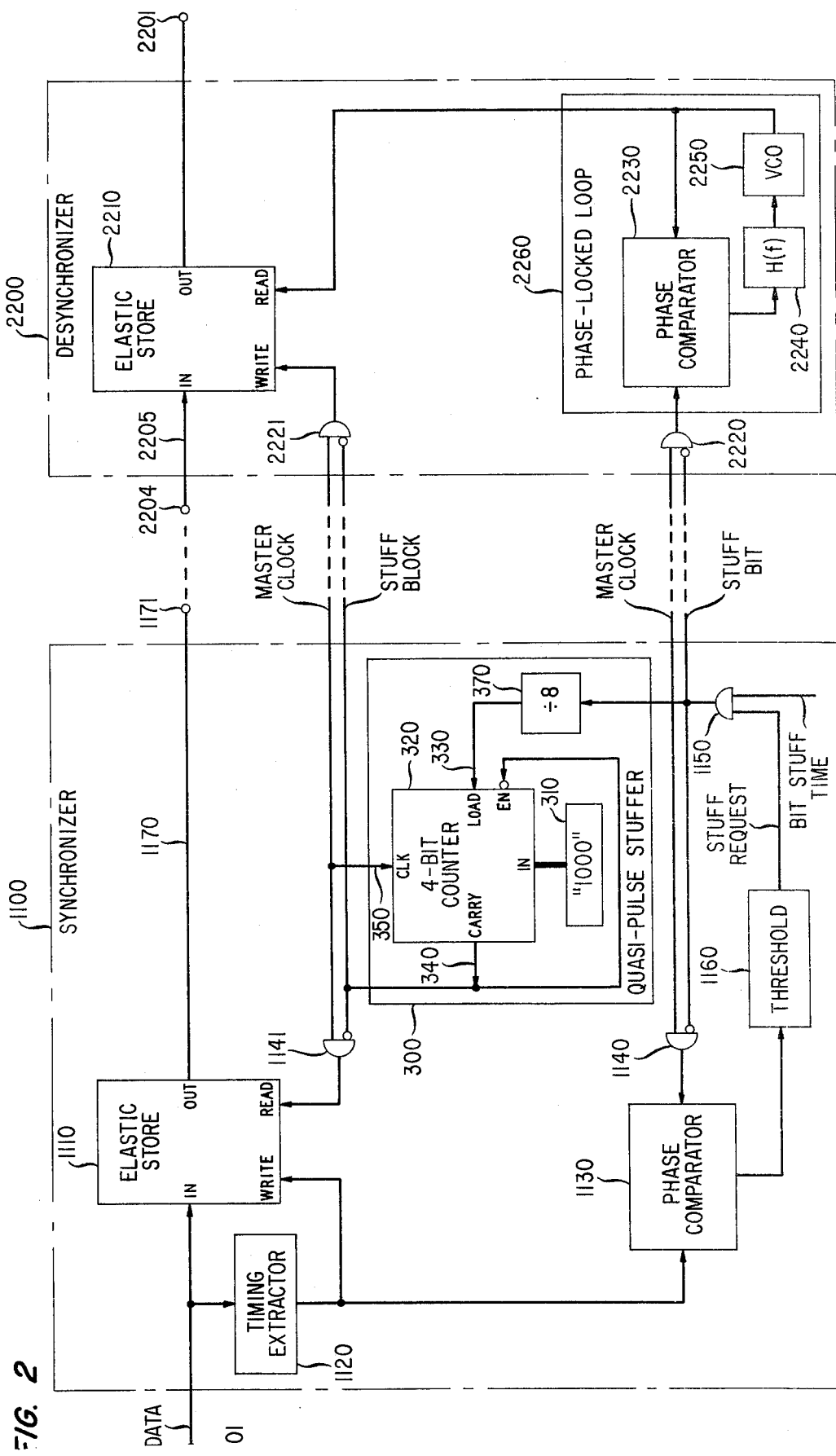

QUASI-PULSE STUFFING SYNCHRONIZATION

BACKGROUND OF THE INVENTION

This invention relates to a digital communication system and, more particularly, to a synchronization arrangement for use in a digital communication system.

In a pulse code modulation (PCM) system, digital signals from each of a plurality of input sources commonly arrive at a digital multiplex circuit. Known multiplex circuits include equipment for buffering the input signals and for interleaving the signals into a digital bit or pulse stream for transmission over a digital transmission link to a receiver. In the interleaving, it is usual to equalize, or synchronize, the bit rates of the signals from the different sources with the bit rate used on the transmission link. Various synchronization arrangements are known in the art. One arrangement, called pulse stuffing, is disclosed in U.S. Pat. No. 3,461,245 issued to V. I. Johannes et al. on Aug. 12, 1969 and entitled "System for Time Division Multiplexed Signals From Asynchronous Pulse Sources by Inserting Control Pulses." In pulse stuffing, an extra bit is selectively inserted, or stuffed, into the transmitted pulse stream and removed, or destuffed, at the receiver. For example, the pulse stream is usually transmitted at a bit rate higher than the bit rate of any of the input sources. Hence, inasmuch as bits may be transmitted faster than bits arrive, the multplex circuit buffer may eventually empty. Responsive to the detection of such an impending event, known pulse stuffing arrangements add a bit to the pulse stream as frequently as needed to equalize the input signal bit rate with the usually fixed bit rate of the transmission link, the latter as set by a master clock within the multiplex.

Pulse stuffing is usually an anathema to a block, or word, oriented system. This occurs, in part, because pulse stuffing is done on a bit-by-bit basis whereas a block oriented system usually operates upon a plurality of bits, called a block. For example, in block stuffing, a block of say N bits rather than the single bit of a pulse stuffing system is stuffed at the transmitter and destuffed at the receiver.

Whether in a pulse or a block stuffing system, the stuffed, transmitted pulse stream is usually read from a receiver buffer responsive to a read clock signal provided by a phase-locked loop (PLL) circuit. As an aside, it is well known that the design of a PLL circuit usually involves a tradeoff between speed of acquisition and filtering performance. For example, rapid acquisition of frequency synchronization with an input signal usually requires a high gain, wideband PLL. On the other hand, a low gain, narrowband PLL provides good filtering performance by shielding the local reference signal from the noise and phase jitter of the input signal. Continuing, the PLL circuit usually responds to control information for identifying the presence of the stuffed pulses. Unfortunately, as the number of consecutively stuffed pulses increases, such as is typical of a block system, so the jitter to, and hence the distortion of, the destuffed signal increases. Of course, the increased jitter could be mitigated by using a narrower-band PLL in the block system than would be used in a pulse stuffing system. In particular, to avoid increasing the jitter, the design bandwidth of a PLL typically decreases as the block size increases. However, as aforementioned, a narrower-band PLL is slower in acquisition time than a wideband PLL.

Accordingly, a broad object of our invention is to provide an improved synchronization arrangement for a block oriented digital communication system.

SUMMARY OF THE INVENTION

This and other objects of our invention are achieved in improved synchronization apparatus for stuffing a block in a digital signal in response to a plurality of requests for stuffing a bit in the digital signal. In one aspect of the invention, quasi-pulse stuffing apparatus for mitigating distortion of the digital signal stuffs a block and is arranged to extend not only a stuffed block signal but also a stuff bit signal for desynchronization. According to another aspect of our invention, the word stuffed digital signal is destuffed using pulse destuffing apparatus in response to the stuff block and the stuff bit signals.

BRIEF DESCRIPTION OF THE DRAWINGS
synchonization

Our invention should become more apparent from the following detailed description when taken in conjunction with the accompanying drawings in which:

FIG. 2 shows an illustrative quasi-pulse stuffing arrangement in accordance with the principles of the present invention.

DETAILED DESCRIPTION

Figure 1:
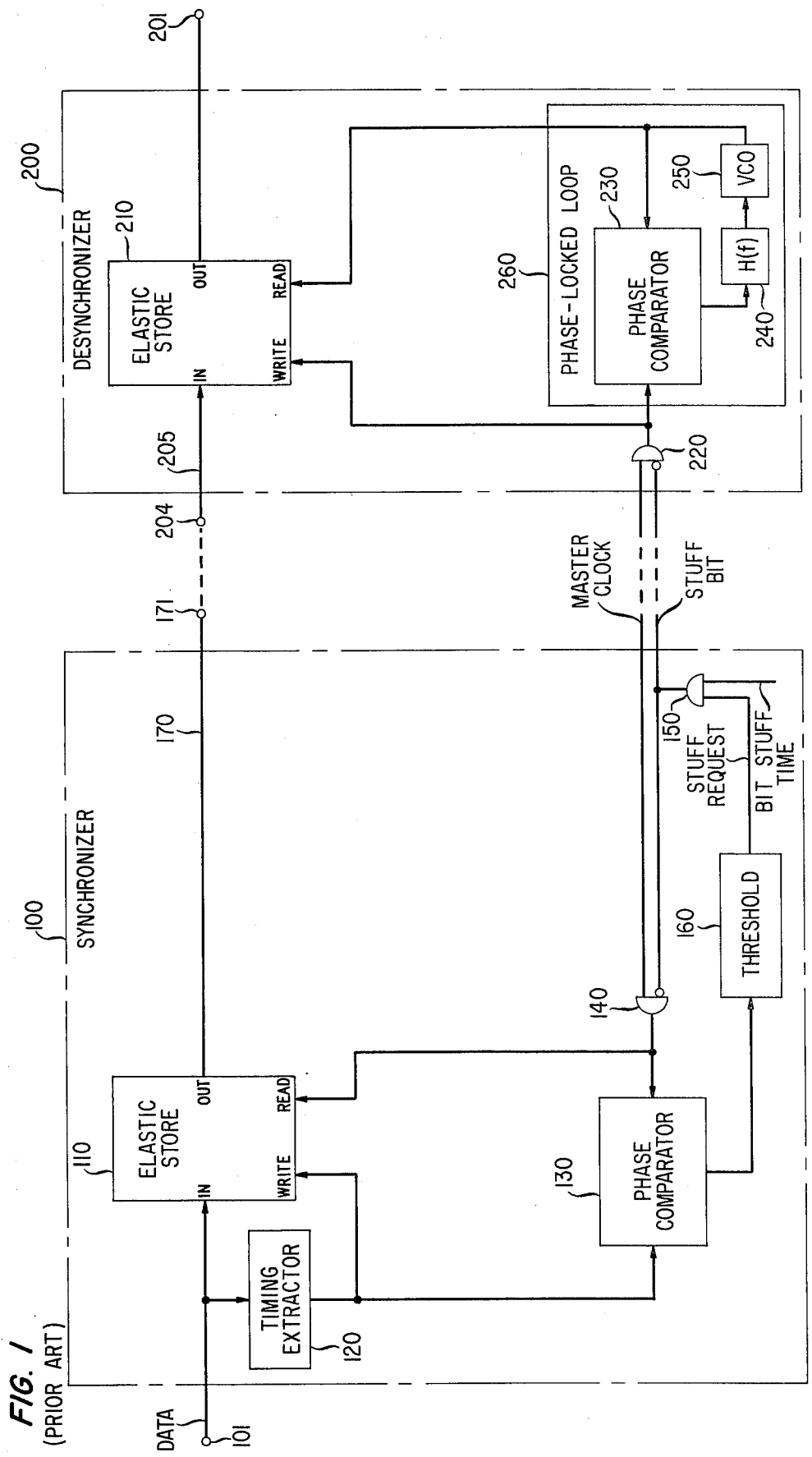
FIG. 1 illustrates a prior art pulse stuffing synchronization arrangement.

FIG. 1 illustrates a typical prior art pulse stuffing synchronization arrangement including synchronizer 100 and desynchronizer 200. A serial bit stream, provided to input terminal 101 of synchronizer 100, is extended jointly therein to an IN input of elastic store 110 and to an input of timing extractor 120, the latter for providing a write timing signal jointly to a WRITE clock input of store 110 and to a first input of phase comparator 130. A typical write timing signal is the 1.544 Mb/s signal associated with a Bell System T1 carrier system. Responsive to a timing bit thereof, a bit of the input bit stream is written into elastic store 110, later to be read therefrom for extension over cable 170 to desynchronizer 200. The bits are read from elastic store 110 responsive to a read timing signal provided to the READ input of store 110. Typically, the read timing signal is consistant with a fixed, master clock transmission link bit rate, e.g., a 1.5458 Mb/s master clock signal. Inasmuch as the read signal is typically a higher frequency signal than is the write signal, all bits which were written into elastic store 110 may eventually be read therefrom. Thus, a gap between written and read bits may eventually exist. Upon detection of the impending gap, a bit or pulse is stuffed into the transmitted pulse stream. In detecting the gap, phase comparator 130 detects a phase difference between write and read clock signals and extends the phase difference to threshold circuit 160. When the phase difference is less than a predetermined threshold, an output of threshold circuit 160 is a logic one stuff request signal. The stuff request signal is extended from the output of threshold circuit 160 to a first input of AND gate 150. A second input to AND gate 150 is a bit stuff time control signal for indicating whether a pulse may (logic one) or may not (logic zero) be stuffed. Thus, responsive to a coincidence of a logic one stuff request and a logic one bit stuff time control signal, a logic one stuff bit signal is extended from an output of AND gate 150 to a first inverting input of AND gate 140. An output of gate 140 is the read clock signal, which, when a logic zero, is for disabling the reading of written bits. Responsive thereto, a stuff pulse is inserted in the bit stream and the stuffed bit stream is extended from an output of store 110 to cable 170. The pulse stuffed bit stream is eventually provided over cable 205 to an input of a desynchronizer 200. Therein the stuffed pulses are removed. In particular, cable 205 is connected to an IN input of elastic store 210. In a manner somewhat parallel to that aforedescribed for synchronizer 100, bits are written into elastic store 210 responsive to a logic one write clock signal extended to its WRITE input. Fortuitously, the desynchronizer write clock signal is substantially the same as the synchronizer read clock signal. Hence, the write signal is a logic zero coincident with a stuffed pulse. Inasmuch as writing into store 210 is disabled responsive to a logic zero write signal, stuffed pulses are not so written in store 210. Hence, stuffed pulses are removed from the written bit stream. On the other hand, absent a stuffed pulse, the stuff bit signal provided to a first inverting input of AND gate 220 is a logic zero. Thus, responsive to each logic one master clock signal provided to a second input of AND gate 220, a logic one write signal is extended from an output of gate 220 jointly to the WRITE input of store 210 and to an input of phase comparator 230 of phase-locked loop 260. Thereby the bit stream on cable 205 is written into elastic store 210. Subsequently, the written bits are read from store 210 responsive to a logic one read clock signal provided to its READ input from an output of phase-locked loop 260, the read bits being extended to output terminal 201.

The read clock signal of desynchronizer 200 is typically the same frequency as the write clock signal of synchronizer 100. Here, the read clock signal is assumed to be the 1.544 Mb/s signal. However, in the presence of a plurality of consecutive stuffed pulses, such as would be typical of a block stuffing system, the prior art synchronization arrangement would encounter abnormal jitter in the desynchronizer read clock signal. Hence, excessive jitter may appear in the serial bit stream read from elastic store 210. An unfortunate consequence of the jitter is a distortion of the digital signal.

An illustrative embodiment of our improved synchronization arrangement for mitigating the signal distortion in a block oriented system is shown in FIG. 2. In accord with the principles of our invention, our arrangement includes a quasi-pulse stuffing arrangement for stuffing a block of pulses while using a conventional pulse stuffing phase-locked loop in the destuffing thereof. And yet, our arrangement mitigates the prior art jitter.

Broadly, synchronizer 1100 of FIG. 2 is substantially similar to prior art synchronizer 100 of FIG. 1, but for having appended thereto quasi-pulse stuffer circuit 300. An output of stuffer 300 is a stuff block signal. Usually, the stuff block signal is a logic zero for enabling the reading of elastic store 1100 and for disabling the stuffing of the digital bit stream. In particular, the stuff block signal is extended to a first inverting input of AND gate 1141. A second input to AND gate 1141 is the master clock signal. An output of AND gate 1141 is a read clock timing signal extended to a READ input of elastic store 1110. Thus, responsive to a logic one master clock signal, which is extended through AND gate 1141 to the READ input, the stuff block logic zero being inverted to a logic one, a bit is read from elastic store 1110. On the other hand, the stuff block signal is a logic one for disabling the reading of elastic store 1110 and for enabling the stuffing of the digital bit stream. In particular, the logic one stuff block signal is inverted by AND gate 1141, thereby forcing the read clock signal to a read disabling and stuff enabling logic zero.

In our quasi-pulse stuffing arrangement, a block is stuffed responsive to a logic one stuff block signal. Specifically, the logic one stuff block signal is advantageously provided responsive to the detection of a predetermined number of requests for a pulse to be stuffed. In the prior art, a logic one stuff bit signal would be provided at the output of AND gage 1150 whenever synchronizer 1100 detects that a pulse should be stuffed. Here, as in the prior art, the stuff bit signal is extended to a first inverting input of AND gate 1140 as well as to phase-locked loop 2260 by way of a first inverting input of AND gate 2220 situated in desynchronizer 2200. Thus, the stuff bit signal is a control signal which identifies that the digital bit stream on cable 1170 would have been pulse stuffed if the system were employing pulse stuffing. The control signal is for controlling the read clock signal provided by phase-locked loop circuit 2260. Inasmuch as PLL circuit 2260 is substantially identical to PLL circuit 260 of FIG. 1, a more expensive, narrower-band PLL is not needed with our quasi-pulse stuffing arrangement. Hence the aforementioned jitter problem is mitigated. Yet, our arrangement stuffs blocks and uses a pulse stuffing PLL.

Still more particularly, the stuff bit output of AND gate 1150 is also extended to an input of quasi-pulse stuffer 300 for detecting the predetermined number, illustratively eight, of requests for a pulse to be stuffed. Specifically, of logic one stuff bit signal is extended from an output of AND gate 1150 to an input of stuffer circuit 300 and, therewithin, to an input of "÷8" circuit 370 for indicating that a pulse should be stuffed. However, a pulse is not stuffed in the pulse stream appearing on lead 1170 until stuffer circuit 300 detects that a predetermined number of, here we assume eight, pulses should have been stuffed. Thus an output of "÷8" circuit 370 is a logic one after detecting eight logic one stuff bit signals; else the output is on logic zero. Upon detection of the logic one output, which is extended over lead 330 to a LOAD input of counter 320, a binary eight, i.e., "1000", is loaded into counter 320 from apparatus 310. Thereafter, responsive to a master clock pulse extended over lead 350 to the CLK clock input of the counter, counter 320 is incremented. The high order bit of counter 320 is extended from the CARRY output of counter 320 over lead 340 jointly to the first inverting input of AND gate 1141 and to an inverting enable EN input of counter 320. Responsive to the high order bit being a logic one for eight counts, i.e., for counter states "1000" through "1111", elastic store 1110 is disabled from reading and enabled to stuff an eight bit block in the digital bit stream extended to cable 1170. Simultaneously, the logic one CARRY output is inverted at the EN input, thereby enabling counter 320 to be incremented responsive to the master clock signal. After a count of eight, the high order output becomes a logic zero, which, when inverted by AND gate 1141, disables the stuffing by elastic store 1110. Concurrently, the logic zero high order output is extended to the inverting enable input of counter 320, thereby disabling further counting until the counter is again loaded responsive to a logic one on lead 330. As a result, a block of eight pulses are stuffed in the output pulse stream.

Even more particularly, the logic one stuff block output of stuffer circuit 300 is extended to the aforesaid first inverting input of AND gate 1141. The output of AND gate 1141 is the read clock signal, which, when a logic zero, is for disabling the reading of bits written into elastic store 1110. Responsive thereto, a block of stuff pulses is extended from an output of elastic store of 1110 to cable 1170. The thus block stuffed bit stream is then provided over cable 1170 onto cable 2205 at an input of desynchronizer 2200. Therein, the block of stuffed pulses is removed. In particular, cable 2205 is connected to an IN input of elastic store 2210. In a manner somewhat parallel to that aforedescribed, bits are written into elastic store 2210 responsive to a logic one write clock signal extended to its WRITE input, the write signal being extended from an output of AND gate 2221. Fortuitously, the desynchronizer write clock signal is substantially the same as the synchronizer read clock signal. Hence the write signal is a logic zero coincident with each stuffed pulse in the block of stuffed pulses. Thereby, a block of stuffed pulses is removed from the written bit stream. Later the bit stream is read from elastic store 2210 as though the block were pulse stuffed and extended to output terminal 2201.

Fortuitously, a block is stuffed at a transmitter synchronizer and pulse destuffed at a receiver desynchronizer. Advantageously, as to the pulse destuffing, the read clock signal of desynchronizer 2200 is adjusted by phase-locked loop 2260 as though the system were a pulse stuffing arrangement rather than a block stuffing system. That is, phase-locked loop 2260 is substantially the same in our word oriented system as phase-locked loop 260 is in the aforedescribed pulse stuffing system. Thereby our quasi-pulse stuffing arrangement successfully word stuffs and pulse destuffs.

We claim:

1. Synchronization apparatus including apparatus for extending a digital signal from an input terminal through an elastic store to an output terminal and including pulse stuffer apparatus coupled to said extending apparatus for providing a stuff bit signal responsive to the detection of a request to insert a pulse in said digital signal, and CHARACTERIZED IN THAT said synchronization apparatus further comprises quasi-pulse stuffing means for mitigating signal distortion, said quasi-pulse stuffing means including means for detecting a predetermined number of said stuff bit signals, means responsive to the detection of said predetermined number for providing a stuff block signal, means responsive to said stuff block signal for stuffing a block in said digital signal and means adapted for extending said stuff block and said stuff bit signals to a desynchronizer.

2. The synchronization apparatus defined in claim 1 wherein said desynchronizer comprises input means adapted to receive said digital signal, means for extending said received digital signal through a second elastic store to a second output terminal, said receive extending means being responsive to said stuff block and said stuff bit signals for destuffing said digital signal whereby block stuffing occurs responsive to a pulse stuffing control signal.

3. The synchronization apparatus defined in claim 2 wherein said second elastic store is written responsive to said stuff block signal and read responsive to a read signal, said read signal being responsive to said stuff bit signal.

4. The synchronization apparatus defined in claim 3 wherein said read signal is provided by apparatus substantially similar to read signal providing apparatus includable in said pulse stuffer apparatus were said digital signal pulse stuffed rather than word stuffed.

* * * * *